July 8, 1969 E. M. WILSON 3,453,878
WIND TUNNEL
Filed June 22, 1967

INVENTOR.
ELDON M. WILSON
BY
ATTORNEY

United States Patent Office 3,453,878
Patented July 8, 1969

3,453,878
WIND TUNNEL
Eldon M. Wilson, Northridge, Calif., assignor to The Garrett Corporation, Los Angeles, Calif., a corporation of California
Filed June 22, 1967, Ser. No. 648,034
Int. Cl. G01m 9/00
U.S. Cl. 73—147                                      6 Claims

ABSTRACT OF THE DISCLOSURE

A test section of a wind tunnel having means for mounting air foil sections in a row, means for rotating each section about an axis so that the angle of attack of each section changes with the other sections, and means for rotating the row with respect to the air stream so that the row forms an oblique angle with the air stream.

---

This invention relates to a wind tunnel and, more particularly, to a supersonic wind tunnel for testing a plurality of air foils mounted in a row.

Present day aircrafts can fly faster than the speed of sound. Their propulsion unit is preferably a turbo-jet engine which can accelerate the aircraft from zero velocity to faster than the speed of sound. The turbo-jets operate by first compressing with suitable compressors the intake air before it is burned with fuel. Up to now, in order to operate efficiently, the compressors have accepted air at subsonic velocities. Whenever the aircraft is flying faster than the speed of sound, a diffuser is required in front of the compressor to decrease the relative speed of the air with respect to the compressors. Diffusers, besides adding weight, have the inherent characteristic that they operate efficiently over a relatively narrow band of intake velocities. Because of this, an axial flow compressor that is capable of compressing efficiently incoming air travelling over a wide band of intake velocities would be very desirable. Before an efficient compressor can be designed, an optimum compressor blade shape would be required. To determine an optimum blade shape, blades with various shapes would have to be tested under simulated flight conditions.

Therefore an object of this invention is to provide a wind tunnel that is capable of testing air foil sections which can be used as blades in an axial flow supersonic compressor.

Another object of this invention is a wind tunnel having means for varying the angle of attack of a row of foil sections at the same time varying the angle of approach that the air stream makes with the row of blades, so that the wind tunnel need not be shut down while the blades are being reset relative to the air stream.

The foregoing and other objects, advantages and characterizing features of this invention will become apparent from the ensuing detailed description of the illustrative embodiment thereof, reference being made to the accompanying drawings wherein.

Figure 1:
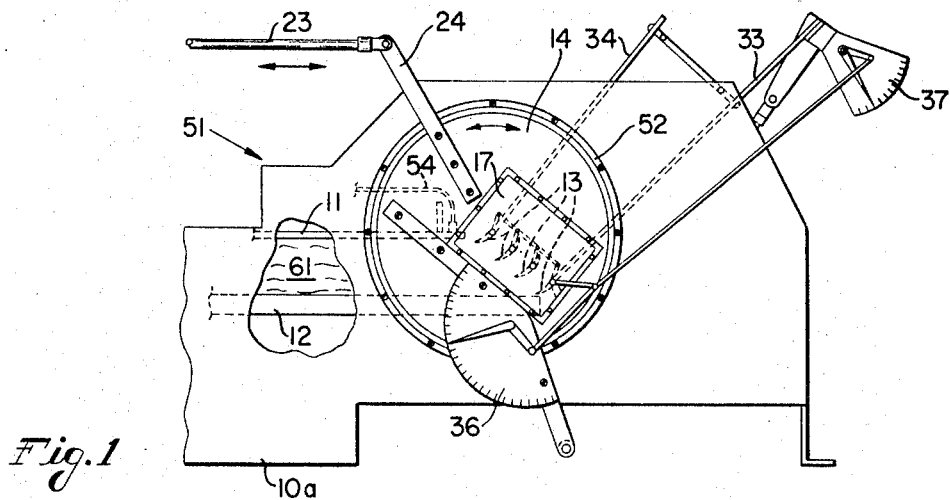
FIG. 1 is an elevation of one side of the wind tunnel and more particularly the throat testing section.

Referring to the drawings, there is shown in FIG. 1 an elevation of the throat section for a wind tunnel 51. The wind tunnel 51 has a plate 10a, shown in FIG. 1, parallel to and spaced from a plate 10b shown in FIG. 2. The distance between the plates may be any desired value depending on the items to be tested, but in this embodiment the open space therebetween is, for example, 8 inches. The plates 10a and 10b are suitably mounted to each other by means not shown. Plate 10a has a circular opening in which is mounted a round plate 14. The round plate 14 is suitably held therein by an annular keeper 52 bolted to plate 10a so that round plate 14 is disposed to rotate relative to the plate 10a. Similarly, plate 10b (FIG. 2) has a circular opening in which is mounted another round plate 16. Plate 16 is held by another annular keeper 53 bolted to plate 10b so that plate 16 is also disposed to rotate relative to the plate 10b. In turn, both round plates 14 and 16 have rectangular openings in which are rigidly mounted windows 17.

Figure 2:
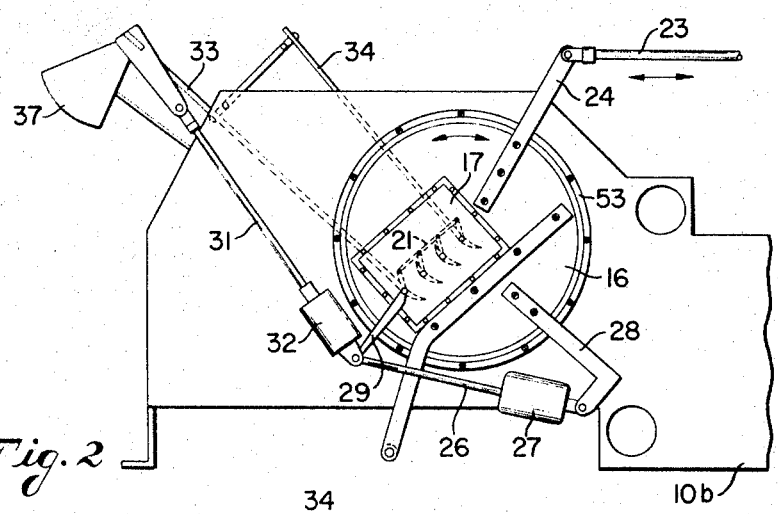
FIG. 2 is an elevation of the other side of the same testing section of the wind tunnel.
Figure 3:
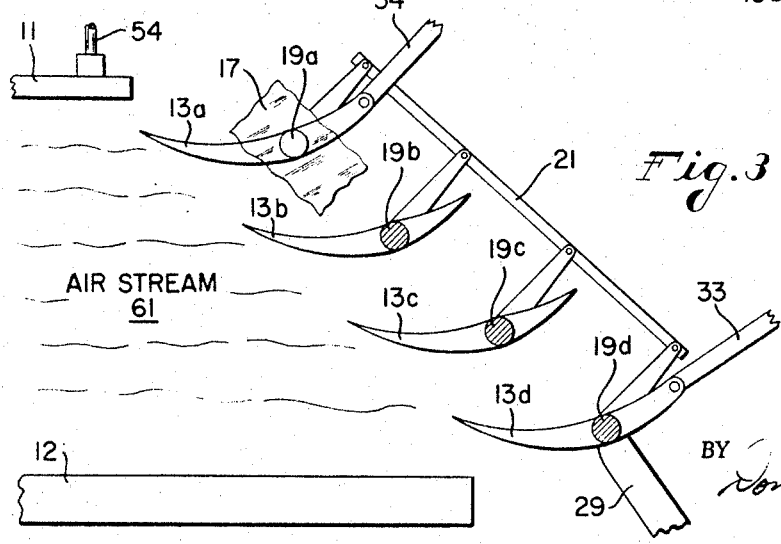
FIG. 3 is an enlarged detailed view of the air foil mountings.

The windows 17 are disposed opposite each other, with four air foil members 13a–13d mounted therebetween. The four air foil members 13a–13d are intended to be the radially extending blades for the axial flow supersonic compressor discussed above. To simulate the mounting of the blades on the compressor, the air foil members 13a–13d are fixedly mounted on respective pins 19a, b, c, and d that are bearing mounted with respect to windows 17. Preferably pin 19a is disposed on the axis of the round plates 14 and 16. As shown in FIG. 2 each one of the pins 19a, b, c, and d has a radial arm fixed thereto and disposed outside of the wind tunnel. The radial arms are pin-connected to a bar 21 so that when one pin is rotated all the pins 19a–19d rotate. The four pins 19a–19d are rotated by an arm 29 suitably fixed to pin 19d which arm 29 is activated by means to be hereinafter described. Thus the air foil members 13a–13d rotate with the respective pins 19a–19d, because the foil members 13a–13d are solidly connected onto the respective pins 19a–19d, and the foil members are always aligned, i.e. all the foil members are facing the same direction.

Between plates 10a and 10b are disposed guide vanes 11 and 12 (shown by dash lines in FIG. 1). The guide vanes 11 and 12 and plates 10a and 10b form a rectangular throat section 61 through which air at supersonic speed may flow. Suitable means, such as a vacuum line 54, is used to reduce the thickness of the boundary layer in a manner well known in the art to ensure that a supersonic flow is maintained within the throat section. The vanes 11 and 12 terminate adjacent the air foil members 13a–13d which are all disposed at the same angle of attack with respect to the air stream. The angle of attack is changed by rotating the arm 29 with respect to round plate 16 in the manner explained above. Arm 29 is activated by an electric actuator 27 through a rod 26 which are pin-connected respectively to the arm 29 and a radial arm 28 fixed to round plate 16. The actuator 27 operates in any suitable manner to cause the relative length of rod 26 to vary so that in turn pin 19d is rotated.

Since the air foil members 13a–13d are to be used on an axial flow compressor, the face angle, i.e. the angle that the air stream makes with a plane defined by the leading edges of the foil members, should be selectively changed to match the relative velocity of the intake air to the compressor face. Thus the test device should incorporate a feature to change the face angle. The face angle is changed when the round plates 14 and 16 are rotated. The plates can be rotated by pulling or pushing on a bar 23 that is pin-connected to both arms 24 wherein one is fixed to round plate 14 and the other to round plate 16. It should be noted that the angle of attack changes as the face angle is changed, but the face angle does not change with changes in the angle of attack. Changes in angle of attack may be measured in any standard manner on a protractor 36.

In addition to providing means for changing the face angle and angle of attack, means are provided to change the direction of the slip stream, i.e. the direction of wind velocity with respect to the foils 13a–13d after the wind passes through the foils. This is accomplished by guide vanes 33 and 34 hinge-connected to the trailing edges of air foil members 13d and 13a respectively. A bar is pin-connected to the other end of both vanes 33 and 34 so that both vanes may move together. The direction of the slip-stream is controlled by another electric actuator 32 through a rod 31 which are pin-connected to lever 29 and vane 33 respectively. Actuator 32 is similar to actuator 27 and causes the relative length of rod 31 to vary so that the triangle formed by vane 33, arm 29 and rod 31 varies. Changes in the relative angle of the slip-stream may be measured by a protractor 37.

The wind tunnel is operated as follows: the air stream in the throat section is accelerated to supersonic velocity. Any shock waves that may form around the air foil member can be observed through the windows 17. The shock waves can be photographed producing what is commonly known as Schlieren Photos to study the flow patterns. Since photographs should be taken quickly, the invention allows for the rapid setting of different face angles and angle of attacks without shutting down the wind tunnel. Up to eighty photographs per minute, showing different settings for air foil members, have been taken using the techniques of this invention.

The preferred embodiment of the invention has been described, and various changes may be resorted to by one skilled in the art without departing from the spirit of the invention.

What is claimed is:
1. A testing section for a wind tunnel comprising:
   means to form a throat,
   means for mounting a plurality of similar air foil members at said throat so that said members rotate as a unit and independently about respective parallel axes passing through said members and includes means for causing all to rotate when one member is rotated, and
   means for changing the position of said members with respect to said throat at the same time an air stream is flowing through said throat towards said members.
2. The testing section of claim 1 wherein said means for mounting comprises:
   a plurality of pins each disposed on a respective one of said axes and aligned in a row whereby a pin lies on each end of the row exterior of the other pins,
   each of said members fixedly mounted on a respective one of said pins, and
   said means for changing includes a lever extending from each pin and said levers being pin-connected to a bar so that when one pin rotates all the pins rotate.
3. The testing section of claim 2 wherein:
   substantially flat plates are disposed on opposite sides of said throat and each of said flat plates has a circular opening coaxially disposed with one another,
   a round plate disposed in each of said circular openings and disposed to rotate therein, and
   said pins are mounted to said round plates so that said pins rotate with said round plate and rotate with respect to said round plates.
4. The testing section of claim 3 wherein:
   a window is provided in each round plate so that said members are observable.
5. The testing section of claim 3 wherein:
   said means for changing further includes a first arm mounted to one pin and a second arm mounted to one round plate, and
   first actuator means mounted between said first and second arm for rotating one arm with respect to the other so that said pins are capable of being rotated independently of said round plate.
6. The testing section of claim 5 wherein:
   a trailing vane is hinge-connected to each of the two exterior ones of said members,
   a bar pin-connected to both trailing vanes adjacent their other ends so that as one trailing vane rotates about its respective hinge the other also rotates about its respective hinge,
   a second actuator means connected between said first arm and one of said trailing vanes to rotate said vane about their hinges.

References Cited

UNITED STATES PATENTS

| | | | |
|---|---|---|---|
| 2,795,137 | 6/1957 | Whitenet | 73—147 |
| 2,910,866 | 11/1959 | Czerwinski | 73—147 |
| 3,029,635 | 4/1962 | Fetz | 73—147 |
| 3,045,705 | 7/1962 | Hausammann | 73—147 XR |
| 3,118,303 | 1/1964 | Hasselquist et al. | 73—147 |
| 3,236,263 | 2/1966 | Holderer | 73—147 XR |

LOUIS R. PRINCE, *Primary Examiner.*

J. NOLTON, *Assistant Examiner.*